United States Patent [19]

Whitaker et al.

[11] Patent Number: 5,303,220
[45] Date of Patent: Apr. 12, 1994

[54] COMPRESSED AIR OPTICAL DRIVE CLEANING CARTRIDGE

[75] Inventors: Kenton L. Whitaker, Fremont; Sunny K. Hsu, Sunnyvale; Nathan Gold, deceased, late of San Jose, by Janet A. Gold, legal representative; Frank Houghton, Campbell, all of Calif.

[73] Assignee: Maxoptix Corporation, San Jose, Calif.

[21] Appl. No.: 945,663

[22] Filed: Sep. 16, 1992

[51] Int. Cl.$^5$ .............................................. G11B 3/58
[52] U.S. Cl. .................................................... 369/71
[58] Field of Search .................... 369/71, 292; 360/128

[56] References Cited

U.S. PATENT DOCUMENTS 5,144,611  9/1992  Engler et al. ........................ 369/71

FOREIGN PATENT DOCUMENTS 62-40641  2/1987  Japan ................................. 369/71
2-42638   2/1990  Japan ................................. 369/71
3-78173   4/1991  Japan ................................. 369/71
4-19880   1/1992  Japan ................................. 369/71

OTHER PUBLICATIONS

IBM Tech. Disclosure Bulletin vol. 35 No. 7 Dec. 1992.

Primary Examiner—Stuart S. Levy
Assistant Examiner—Paul J. Ditmyer
Attorney, Agent, or Firm—Blakely, Sokoloff, Taylor & Zafman

[57] ABSTRACT

An apparatus and method for cleaning components internal to an optical recording system without requiring the optical recording system to be disassembled. The apparatus is comprised of inlets through which pressurized gas is fed. The pressurized gas is directed through channels within the apparatus to various outlets. The pressurized gas is then expelled from these outlets. When the apparatus is inserted in the optical recording system, the outlets are located next to components sensitive to particle contamination. Thus, the expelled gas removes the particle contaminants from the surfaces of the components, thereby enhancing operation of the optical recording system.

9 Claims, 7 Drawing Sheets

FIG_1

FIG_2

FIG_3

FIG_4

FIG_5A

FIG_5B

FIG_5C

FIG_6

FIG_7A

FIG_7B

FIGURE 8

COMPRESSED AIR OPTICAL DRIVE CLEANING CARTRIDGE

FIELD OF THE INVENTION

The present invention pertains to the field of optical recording systems. More particularly, the present invention relates to an apparatus and method for cleaning optical recording systems.

BACKGROUND OF THE INVENTION

Information storage applications continue to grow at a rapid rate due to the successful development of business and consumer products for processing data, video, and audio signals. Most notably, with the explosion of personal computer systems in the workplace, there exists a great need for storing digital data. Digital data is discrete in time and level and is typically stored in the form of binary 1's and 0's. Advances in digital storage products have mostly been limited to three key storage technologies: semiconductors (e.g., ROMs, RAMs, PROMs, "flash" EPROMs, etc.), magnetic recording systems (e.g., tapes, flexible disks, hard disks, etc.), and more recently to optical recording systems (e.g., tape cartridges, CD ROMs, laser disks, magneto-optical disks, etc.). Competing storage technologies have been all but eliminated due to the consequent and steady reductions in the price of semiconductor, magnetic, and optical storage systems.

Presently, optical recording systems enjoy great commercial appeal because of their high storage capacity, cost effectiveness, and reduced susceptibility to noise and data corruption. Optical recording systems are ideal for storing vast amounts of data on a permanent or long term basis. Furthermore, the advent of Write-Once-Read-Many (WORM) technology offers added flexibility and versatility for optical recording systems. WORM technology allows an optical medium to be repeatedly erased and written to many times over. In other words, old, useless data stored on an optical medium can now be erased and new data written in replacement thereof.

Typically, optical recording systems employ a laser or some other form of light source to "read" and "write" data from/to an optical medium. In a "write" operation, the light is directed by means of a lens assembly and focused onto the optical medium. The focused light causes a characteristic of the optical medium to become altered. The optical medium retains the altered characteristic, even after the light source has been removed. By pulsing the laser over various, designated portions of the media, digital data can be "written" and stored onto those portions. Later, the data can be retrieved by directing the light to the portion of the media containing the desired data. The data is "read" from the medium by detecting the signal contained in the light reflected off the media.

However, one common problem shared by virtually all optical recording systems is that of particle contaminants. Particle contaminants, such as dust, enter optical recording systems through various openings in the housing. One way in which particles typically enter is through the opening used to enter and remove the optical media. Sometimes, particles are also introduced into the device through the air vents. Due to the excessive heat generated by the internal circuits and power supply, open air vents are provided for cooling. In many cases, fans are used to circulate surrounding air within the optical recording system. Otherwise, the lifespan of the optical recording system would be greatly retarded. Furthermore, in certain types of optical recording systems, such as magneto-optical disk drives, it is highly desirous to keep the temperature constant, as the read/write process is temperature dependent.

Once these particles invade the interior of an optical recording system, they oftentimes settle onto sensitive components. Some of the components most susceptible to particle contamination are those of the lens assembly and, particularly, the focusing lens. Dust particles which settle on the lens used to collimate the light, the beam splitters, the mirror, and the focusing lens, interfere with the light beam used to read and write data. The direct result is an increase in the amount of noise in the signals during read/write operations. Increased noise significantly degrades the overall performance of the optical recording system because it introduces errors.

Additional circuits can be implemented to compensate for the particle contaminants. The disadvantage with additional circuits is that the circuits add to the complexity of the system and increase costs. Moreover, these additional compensation circuits would eventually be overwhelmed as more and more dust particles settle on the various components.

Furthermore, some of the particles settle on the rails and bearings used to physically move the lens to the correct track during seek operations. This could have dire consequences. These dust particles might interfere with the seek operation to cause the wrong track to be accessed. If the wrong track were accessed, the drive will have to do re-seek and the access time will increase.

Typical prior art solutions to the problems caused by particle build-up involved removing the optical recording system's housing and disassembling various circuit boards and other hardware to gain physical access to the system's optics and actuator assembly. A brush is then used to sweep the particles off these sensitive components. A test is performed on the unit to verify that it is in proper working condition. Afterwards, the unit is reassembled.

One disadvantage with his process is that it is labor intensive. In addition, the lenses are delicate and physical contact by the brush might damage them. Another disadvantage is the likelihood of accidentally damaging other components of the optical recording system during the disassembling, cleaning, and reassembling process. A further complication is that this process is typically performed at the manufacturer's facilities. As such, the unit has to be packed and shipped. The optical recording system is subject to being damaged during shipping.

One prior art apparatus and method involves implementing a cartridge having one or more brushes. When the cartridge is inserted into the optical recording system, the brushes are placed over and contact the lenses. The optical recording system's spindle motor is used to spin the brushes, thereby cleaning the lenses. Again, this process suffers from the fact that the lenses might be accidentally damaged by the physical contact with the brushes. Also, this implementation does not clean other parts of the optical recording system which are adversely affected by particle build-up, namely the actuator assembly.

Thus, what is needed is an apparatus and method for cleaning various internal components of an optical recording system which is quick, reliable, easy to use, and does not subject the components to being damaged.

SUMMARY AND OBJECTS OF THE INVENTION

In view of the problems associated with the degradation of an optical recording system's performance due to particle contaminants, one object of the present invention is to provide an apparatus and method for displacing the particle contaminants from sensitive internal components.

Another object of the present invention is to displace particle contaminants in a fast, efficient, safe, and easy-to-use manner.

Another object of the present invention is to minimize damages to the optical recording system during the process of displacing the particle contaminants.

Another object of the present invention is the displacement of particle contaminants from internal components without requiring any disassembly of the optical recording system.

Another object of the present invention is the displacement of particle contaminants from internal components without direct physical contact with any of the internal components.

Yet another object of the present invention is to displace particle contaminants from multiple internal components, including the actuator assembly and various optics.

These and other objects of the present invention are implemented in a cleaning cartridge having a plurality of inlets for accepting pressurized gas. The cleaning cartridge is comprised of a number of separate channels corresponding to the inlets. Pressurized gas inputted through the inlets are conveyed by the channels to multiple outlets. The pressurized gas is then expelled from the cleaning cartridge via these outlets.

The cleaning cartridge is of a size such that it can be inserted into an optical recording system in the same manner as for standard optical cartridges. First, the optical recording system is turned on. Next, the cleaning cartridge is inserted. The optical recording system "spins up" and places the carriage assembly in a predetermined location. Since the carriage position is at a fixed, known position, the outlets are located on the bottom of the cleaning cartridge so that the expelled gas hits the objective lens on the carriage. In addition, other outlets are located as to expel gas onto the rails upon which the carriage slides.

Moreover, the cleaning cartridge also includes two tubes bent at approximately 90 degrees. When inserting and removing the cleaning cartridge, these tubes do not protrude from the cleaning cartridge. Upon proper insertion, two levers are depressed. These levers rotate the tubes so that they protrude from the lower body of the cleaning cartridge. The outlets from these tubes are directed to fixed optics and to the routing mirror within the optical recording system. Thus, when pressurized gas is input through the inlets of these tubes, the gas is directed to hit the fixed optics and the routing mirror.

A canister containing pressurized gas is used to successively input the pressurized gas through the inlets, one at a time. Two short bursts of gas are released from the canister into each of the inlets. Hence, when the gas expelled from the cleaning cartridge hits the objective lens, the rails, the fixed optics, and the routing mirror, the force of the gas removes particle contaminants from their surfaces, thereby cleaning them and improving the overall operation of the optical recording system.

Upon completion of the cleaning process, the user hits the eject button on the optical recording system. The cleaning cartridge is ejected and is safely stored for future use.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for displacing particle contaminants settled on components internal to an optical recording system is described. In the following description, numerous specific details and structures are set forth in order to provide a thorough understanding of the present invention. It will, however, be evident that various modifications and changes may be made thereto without departing from the broader spirit and scope of the invention as set forth in the appended claims. The specifications and drawings are, accordingly, to be regarded in an illustrative rather than a restrictive sense. In addition, although the following detailed description is in reference to a magneto-optical disk drive system, the present invention can readily be applied to other types of optical recording systems as well, so long as they employ a removable optical medium. For example, the present invention can be applied to tape cartridges, compact-disks, laser disks, write-once-read-many (WORM) disks, removeable Winchester hard disks, etc.

In most optical recording systems, the media onto which the digital data is stored is removable. Once an optical medium becomes completely full, that optical medium is removed from the optical recording system and a new, different optical medium can then be inserted in its place. Thereby, vast amounts of data can be stored on a plurality of optical media and accessed by any compatible optical recording system.

In many instances, optical media take the form of circular optical disks. These disks are spun about an axis to provide access to data stored in various portions of the disk. For example, in optical disk drives, a motor rotates the disks about a spindle. A servomechanism positions the focused light beam in reference to fixed radial locations over the disk surface. Thus, as the focused light beam is sequentially moved radially across the spinning optical disk, a spiral grove is described. Digital bits of data are written in between the borders, known as "tracks", defined by the spiral groove. Likewise, when data is read from the disk, a "seek" is performed. A "seek" positions the focused light beam onto the "track" containing the desired data to be accessed. In this manner, data is stored onto the disks and can later be retrieved.

Typically, disks are enclosed within a clear, transparent plastic disk cartridge. The disk cartridge is used to protect the disk when it is being handled. The disk cartridge also facilitates loading the disk into an optical recording system. The cartridge is made of a clear, transparent material to allow the light beam to pass through it with minimal distortion when reading and writing data from/to the optical disk. The present invention uses a similar cartridge device for a different purpose. The cleaning cartridge of the present invention is not used for the purpose of holding an optical disk, but rather to clean various internal components of the optical disk drive.

Figure 1:
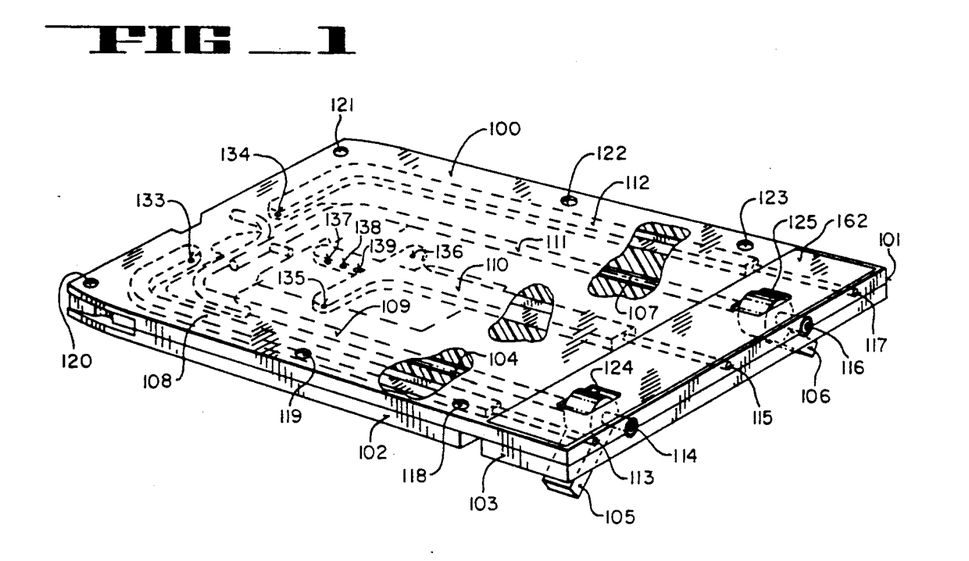
FIG. 1 illustrates a top-down objective view of a cleaning cartridge upon which the preferred embodiment of the present invention can be implemented.

FIG. 1 illustrates an top-down objective view of a cleaning cartridge 100 upon which the preferred embodiment of the present invention can be implemented. Cleaning cartridge 100 is made of a hard plastic material. In the currently preferred embodiment, it is made of standard ABS plastic. Note that it need not be made of a clear, transparent material because it is no longer required for a light beam to pass through it since there is no optical disk to access. Cleaning cartridge 100 can be manufactured either by standard injection molding process or by machining the plastic.

The width and height of cleaning cartridge 100 is approximately the same dimensions as those set forth by the International Standards Organization (ISO) for standard optical disk cartridges. However, the length of cleaning cartridge 100 is greater than those of standard optical disk cartridges by approximately 38 millimeters. The outer dimensions for the body of cleaning cartridge 100 are approximately 190.5×135×10 millimeters. The back end (i.e., the end that is first inserted) is slightly tapered to aid in guiding cartridge 100 as it is being inserted into the optical disk drive.

Cleaning cartridge 100 is comprised of a top cover 101, a bottom cover 102, a lever protector cover 103, a left pressure tubing 104, a left lever 105, a right lever 106, and a right pressure tubing 107.

Top cover 101 includes five channels 108-112. Each of the five channels 108-112 are physically separate from the other four channels. Furthermore, each of these five channels 108-112 has a corresponding inlet 113-117, respectively. The five inlets 113-117 are used to accept the input of compressed gas, such as air. Channels 109 and 111 house left pressure tubing 104 and right pressure tubing 107, respectively. Channels 108, 110, and 112 are used to direct the flow of compressed gas to a particular destination. These destinations are depicted as small holes 133-139. Holes 133-139 extend from their respective channels and through the bottom of top cover 101 to bottom cover 102.

Top cover 101 has a total of ten holes. Holes 118-123 feed through top cover 101. They are used to accommodate six socket head bolts used to affix top cover 101 to bottom cover 102. The other four holes are covered by an instruction panel 162. These four holes also feed through top cover 101. Four socket head bolts are inserted through these four holes to affix top cover 101 to lever protector cover 103. The ten holes are countersunk so that the socket heads of the ten bolts are recessed within the holes. Thus, the upper surface of top cover 101 is flat and even.

Two dowel pins (not shown in FIG. 1) are affixed to top cover 101. These dowel pins are matched to two guide holes in the bottom cover 102. By mating the two dowel pins to the two guide holes, top cover 101 is correctly aligned to bottom cover 102.

Top cover 101 also includes two rectangular openings 124 and 125. These openings are used to accommodate left lever 105 and right lever 106, respectively.

Levers 105 and 106 are comprised of cylindrical bodies having handles extending outward from the bodies. A portion of left pressure tubing 104 runs axially through the center of the cylindrical body of left lever 105. Left pressure tubing 104 is physically coupled to left lever 105. Likewise, a portion of right pressure tubing 107 runs axially through the center of the cylindrical body of right lever 106. Right pressure tubing 107 is physically coupled to right lever 106.

Figure 2:
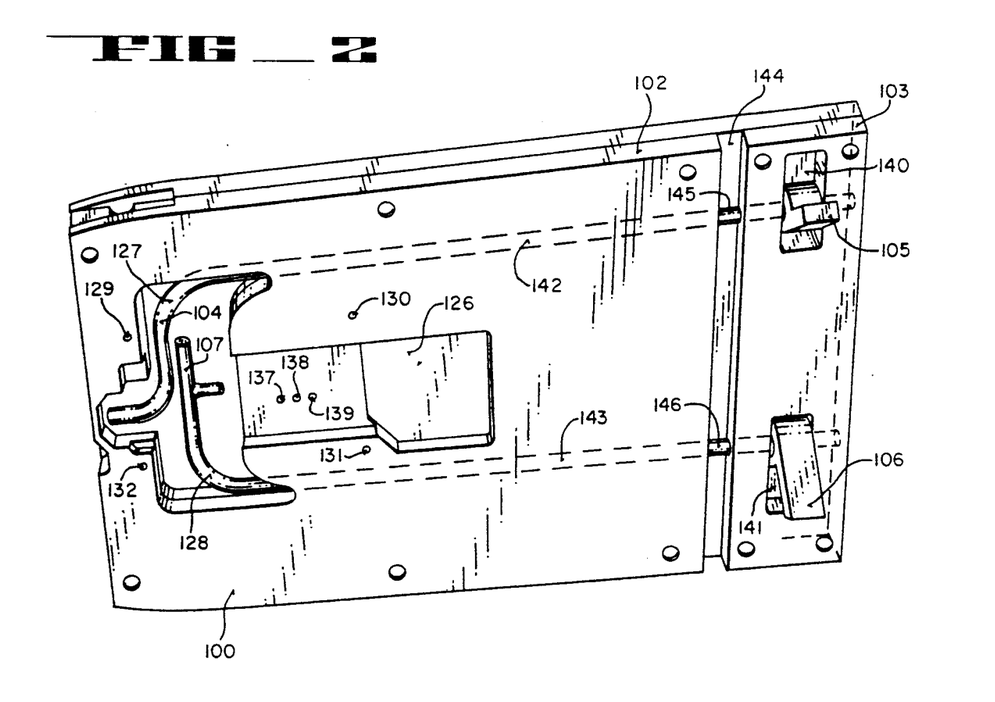
FIG. 2 illustrates a bottom-up objective view of a cleaning cartridge upon which the preferred embodiment of the present invention can be implemented.

FIG. 2 illustrates a bottom-up objective view of cleaning cartridge 100 upon which the preferred embodiment of the present invention can be implemented. It can be seen that the bottom cover 102 also includes two channels 142 and 143 which accommodates the left 104 and the right 107 pressure tubings. In other words, pressure tubings 104 and 107 reside halfway in between top cover 101 and bottom cover 102. Similarly, portions of pressure tubings 104 and 107 reside halfway in between top cover 101 and lever protector cover 103.

Bottom cover 102 has a cross-shaped opening 126. Opening 126 is used to provice space for allowing pressure tubings 104 and 107 to be rotated. Note that pressure tubings 104 and 107 are gradually bent at 90 degree angles, as indicated by 127 and 128. When left pressure tubing 104 is rotated clockwise, this causes the portion extending beyond the 90 degree bend 127 to extend outwards, perpendicular from the body of cleaning cartridge 100. Similarly, rotating pressure tubing 107 counterclockwise causes the portion extending beyond the 90 degree bend 128 to extend outwards, perpendicular from the body of cleaning cartridge 100.

The right portion of opening 126 is required to accommodate various hardware components internal to the optical disk drive once cleaning cartridge 100 is inserted. A space must be provided for the spindle motor and the carriage assembly.

Bottom cover 102 has four small holes 129-132. These holes extend through the height of bottom cover 102. Holes 129–132 respectively align with holes 133–136 in top cover 101. Note that holes 137–139 of top cover 101 are exposed, due to the opening 126 in bottom cover 102.

Lever protector cover 103 includes two rectangular openings 140 and 141. Openings 140 and 141 are used to accommodate the bodies and handles of left lever 105 and right lever 106, respectively. The right and left edges of openings 140 and 141 are aligned with the right and left edges of openings 124 and 125 in the top cover 101, respectively. Even though they have the same width, it can be seen that openings 140 and 141 are longer, to accommodate the handles of the levers.

The left edge of lever protector cover 103 is not flush against the right edge of bottom cover 102. A gap 144 separates lever protector cover 103 from bottom cover 102. Gap 144 is approximately 8 millimeters wide. Portion 145 of left pressure tubing 104 is exposed. Similarly, portion 146 of right pressure tubing 107 is exposed. The purpose of gap 144 is to allow cleaning cartridge 100 to drop down into the optical disk drive when it is inserted.

Note that when the total length of left pressure tubing 104 resides flush against the lower plane of top cover 101, left lever 105 protrudes from the lower plane of lever protector cover 103 at an angle of approximately 38 degrees. Similarly, when the total length of right pressure tubing 107 resides flush against the lower plane of top cover 101, right lever 107 protrudes from the lower plane of lever protector cover 103 at an angle of approximately 38 degrees.

Figure 3:
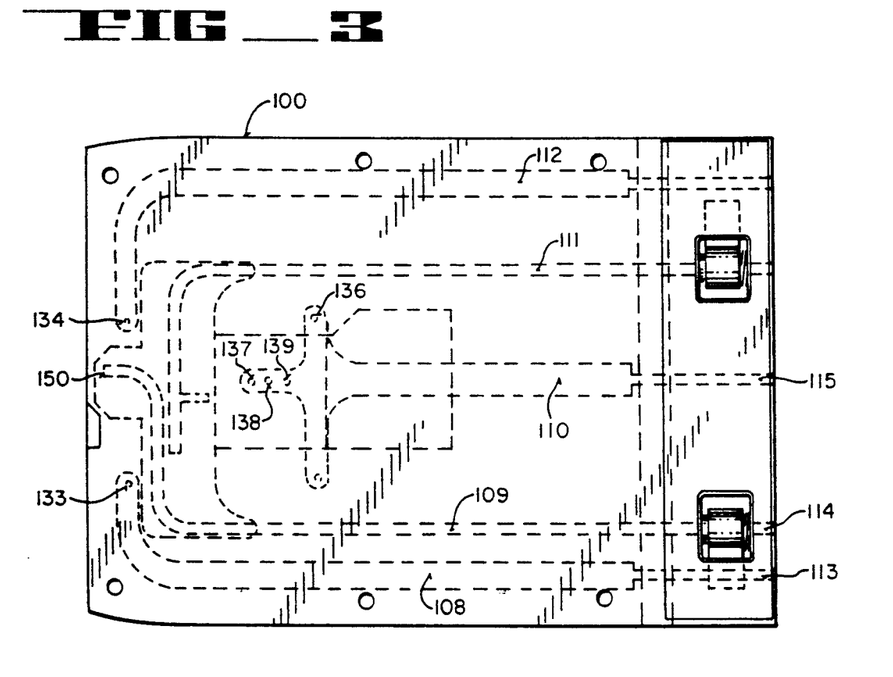
FIG. 3 illustrates a top view of a cleaning cartridge.

FIG. 3 illustrates a top view of cleaning cartridge 100. The five channels 108–112 are more clearly illustrated. Channel 108 accepts compressed gas from inlet 113 and directs the compressed gas to opening 133. The compressed gas is then expelled from the bottom of cleaning cartridge 100 via opening 130 of bottom cover 102. Channel 109 houses left pressure tubing 104. Left pressure tubing 104 receives compressed gas from inlet 114 and directs it to be output through nozzle 150. Channel 110 accepts compressed gas from inlet 115 and directs it to openings 135–139. Part of the compressed gas is expelled from the bottom of cleaning cartridge 100 via openings 131 and 132 in bottom cover 102. The rest of the compressed gas is expelled form the bottom of cleaning cartridge 100 directly through openings 137–139. Channel 111 houses right pressure tubing 107. Right pressure tubing 107 accepts compressed gas from inlet 116 and directs it to nozzle 151. Channel 112 accepts compressed gas from inlet 117 and directs it to opening 134. The compressed gas is then expelled from the bottom of cleaning cartridge 100 via opening 129 in bottom cover 102.

Figure 4:
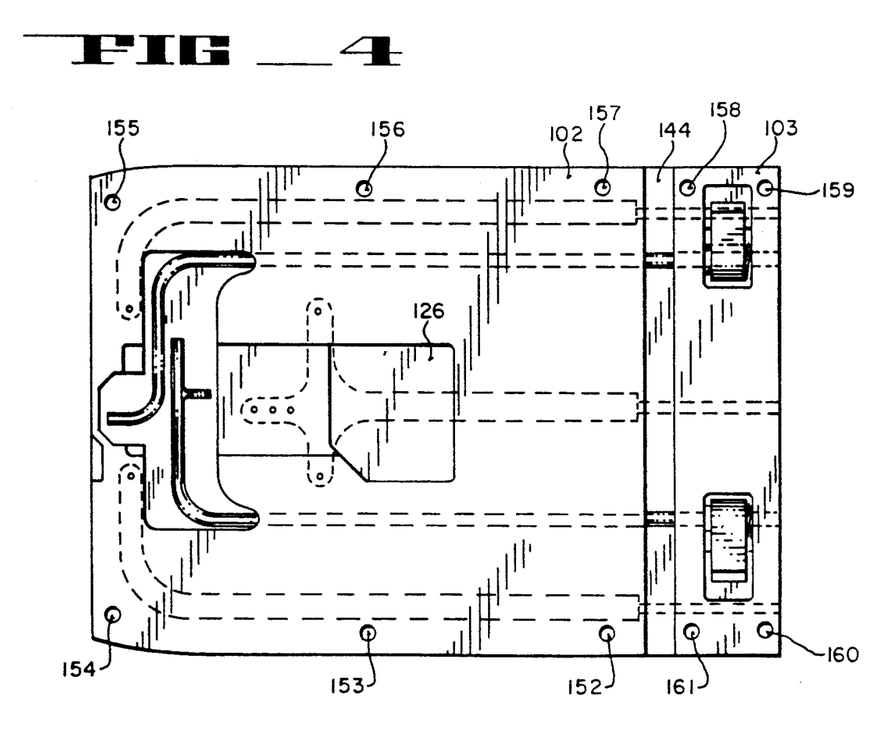
FIG. 4 illustrates the bottom view of a cleaning cartridge.

FIG. 4 illustrates the bottom view of cleaning cartridge 100. The gap 144 separating bottom cover 102 and lever protector cover 103 is clearly depicted. The boundary of opening 126 in bottom cover 102 is also more clearly depicted. Holes 152–161 are provided to receive the ten bolts extending from the ten holes of top cover 101. The ten holes in top cover 101 are aligned with the six holes in the bottom cover 102 and the four holes in the lever protector cover 103. Ten self cinching nuts are attached to the ends of the bolts. Thereby, bottom cover 102 is fastened to top cover 101, and lever protector cover 103 is fastened to top cover 101. Holes 152–157 are countersunk so that the ten nuts are recessed within the holes.

Figure 5A:
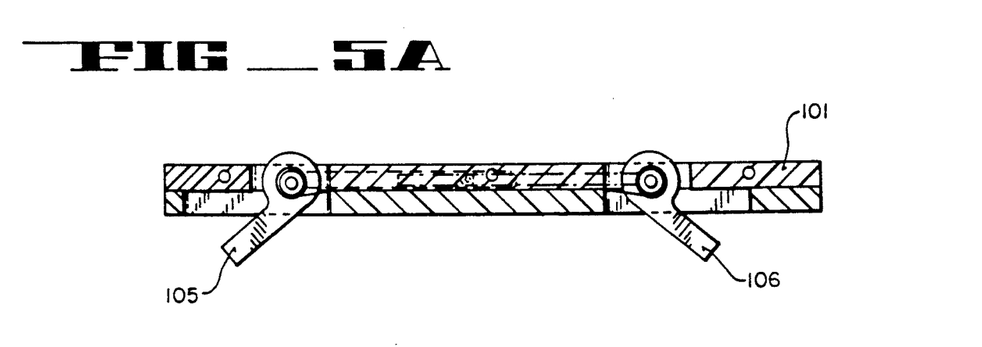
FIG. 5A illustrates a front cross-sectional view of the cleaning cartridge, detailing the positions of the left and right levers in their normal, relaxed states.

FIG. 5A illustrates a front cross-sectional view of cleaning cartridge 100, detailing the positions of the left and right levers 105–106 in their normal, relaxed states. The left and right levers 105–106 are spring loaded. When levers 105–106 are not acted upon by an outside force, the springs cause levers 105–106 to assume these positions. The springs (not shown in FIG. 5A) are attached within the bodies of levers 105–106. Note that in the normal, relaxed state, the left and right pressure tubings 104 and 107 are residing flush against the lower surface of top cover 101. Also note the five channels 108–112 running through top cover 101.

Figure 5B:
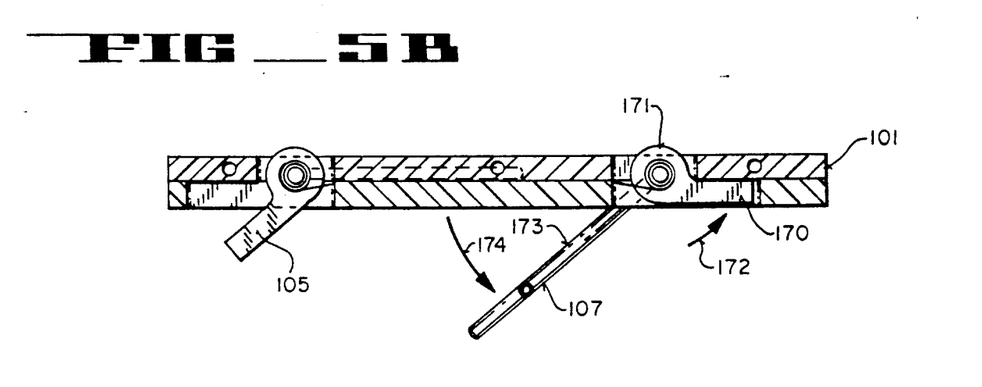
FIG. 5B illustrates a front cross-sectional view of the cleaning cartridge, detailing the positions of the right lever when it is depressed.

FIG. 5B illustrates a front cross-sectional view of cleaning cartridge 100, detailing the positions of the right lever 106 when it is depressed. Manually depressing handle 170 of lever 106 causes the cylindrical body portion 171 to rotate counterclockwise, as indicated by arrow 172. Since right lever 106 is physically coupled to right pressure tubing 107, the tubing is also rotated counterclockwise. As described above, tubing 107 is gradually bent at a 90 degree angle. Thus, as tubing 107 is rotated, that portion 173 of the tubing beyond the bend moves counterclockwise away from top cover 101. This movement is depicted by arrow 174. Lever 106 is depressed until it makes physical contact with the lower surface of top cover 101. In this state, portion 173 of tubing 107 is slanted at an angle away from the lower surface of top cover 101. When lever 106 is released, it immediately snaps back to it normal state, depicted in FIG. 5A.

Figure 5C:
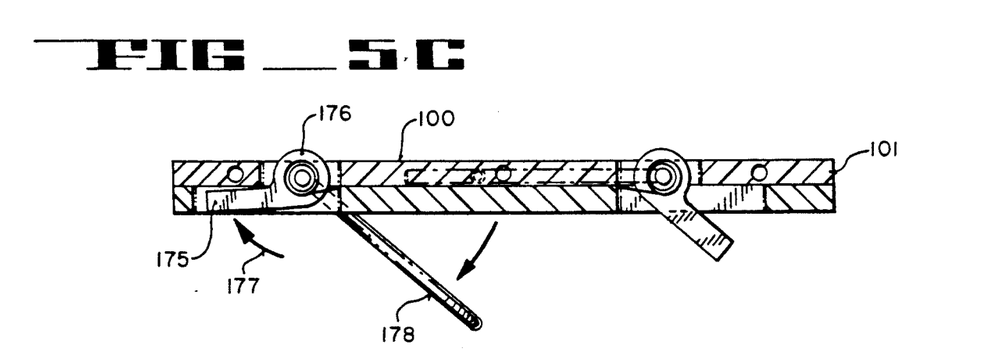
FIG. 5C illustrates a front cross-sectional view of the cleaning cartridge, detailing the positions of the left lever when it is depressed.

FIG. 5C illustrates a front cross-sectional view of cleaning cartridge 100, detailing the positions of the left lever 105 when it is depressed. Manually depressing handle 175 of lever 105 causes the cylindrical body portion 176 to rotate clockwise, as indicated by arrow 177. Since left lever 105 is physically coupled to left pressure tubing 104, the tubing is also rotated clockwise. As described above, tubing 104 is gradually bent at a 90 degree angle. Thus, as tubing 104 is rotated, that portion 178 of the tubing beyond the bend moves clockwise away from top cover 101. This movement is depicted by arrow 179. Lever 105 is depressed until it makes physical contact with the lower surface of top cover 101. In this state, portion 178 of tubing 104 is slanted at an angle away from the lower surface of top cover 101. When lever 105 is released, it immediately snaps back to it normal state, depicted in FIG. 5A.

Figure 6:
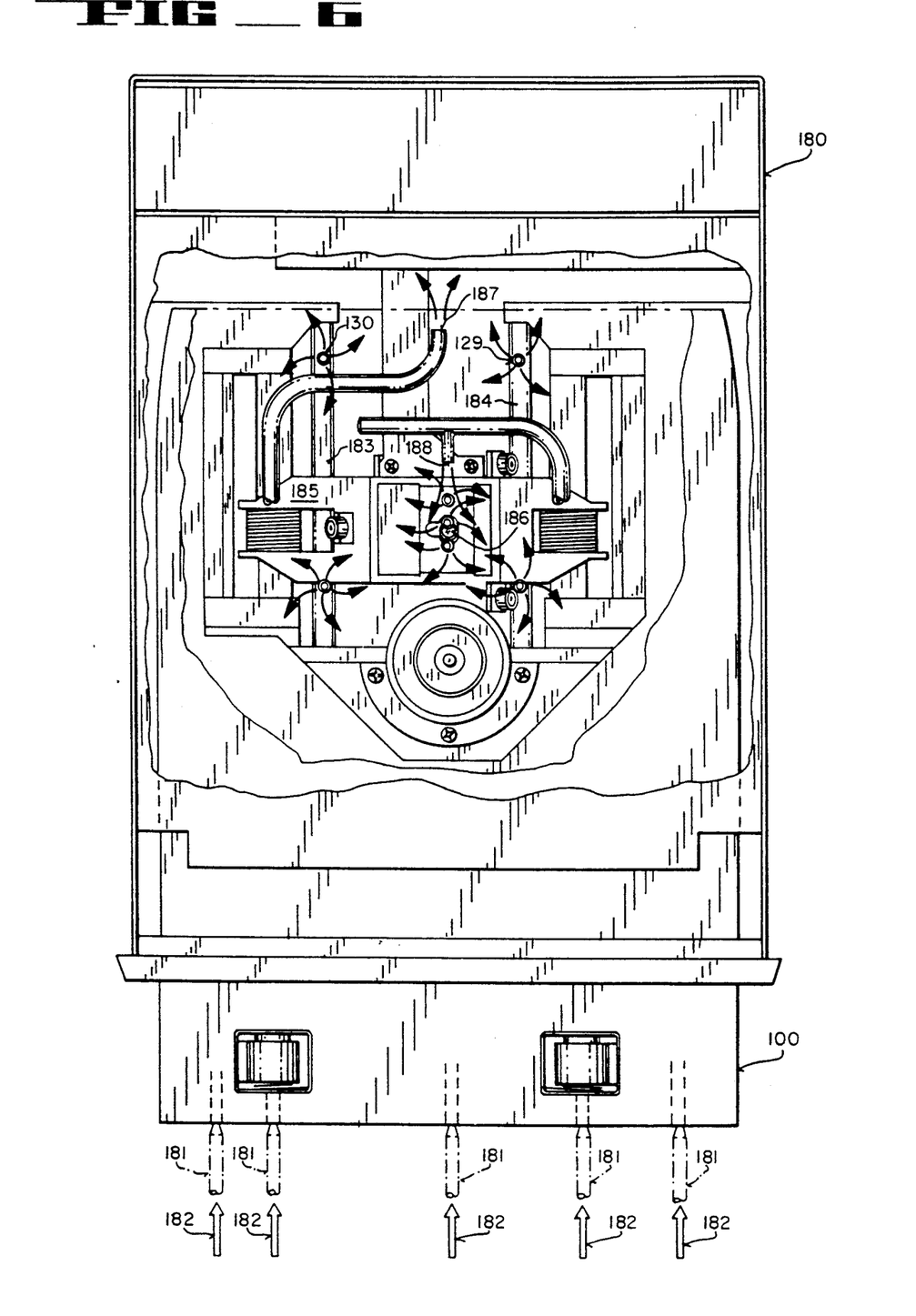
FIG. 6 illustrates a top view of an optical disk drive with an inserted cleaning cartridge, wherein sections have been cut away to expose the flow of compressed air from the cleaning cartridge about certain internal components.

FIG. 6 illustrates a top view of an optical disk drive 180 with an inserted cleaning cartridge 100, wherein sections have been cut away to expose the flow of compressed gas from cleaning cartridge 100 about certain internal components. The tapered tip of a nozzle 181 is successively inserted into each of the inlets 113–117. Compressed gas 182 is input to the inlets.

When compressed gas is fed into inlet 113, it is expelled from opening 130 on the bottom of cleaning cartridge 100. Opening 130 is positioned over the back portion of left rail 183. As the compressed gas flows downwards, it hits left rail 183, thereby blowing off particle contaminants which might have settled in that area. Similarly, when compressed gas is fed into inlet 181, it is expelled from opening 129 on the bottom of cleaning cartridge 100. As the compressed gas flows downwards, it hits the back portion of right rail 184. The gas flow blows off particle contaminants which might have settled in that area. Left rail 183 and right rail 184 are stationary tracks upon which carriage 185 slides.

When compressed gas is fed into inlet 115, it is expelled from openings 131–132 and 137–139 in the bottom of cleaning cartridge 100. As the compressed gas flows downwards from openings 131–132, it hits the frontal portions of the left 183 and right 184 rails. Thereby, particle contaminants settling in those areas are blown away. Openings 137–139 expel the compressed gas downwards over the objective lens 186 used to focus the light beam onto an optical disk. Thus, particle contaminants residing on objective lens 186 are blown away. In the currently preferred embodiment, three openings are used to direct gas to objective lens 186 in order to allow for the tolerances in the position of carriage 185. In other words, three openings 137–139 are used for full coverage of gas flow over objective lens 186 to ensure its cleaning.

When compressed gas is fed into inlet 114, it is directed through left pressure tubing 104 and expelled through nozzle 187. Note that left lever 105 is kept depressed during this cleaning process (i.e., when compressed gas is being input to inlet 114). Depressing left lever 105 causes nozzle 187 to be positioned correctly for blowing gas onto the fixed optics. As compressed gas flows over the fixed optics (e.g., collimating lens, beam splitters, etc.), particle contaminants which settled on the optics are blown away.

Likewise, when compressed gas is fed into inlet 116, it is directed through the right pressure tubing 107 and expelled through nozzle 188. Note that the right lever 106 is kept depressed during this cleaning process (i.e., when compressed gas is being input to inlet 116). Depressing right lever 106 causes nozzle 188 to be positioned correctly for blowing the gas onto the routing mirror (not shown). The routing mirror reflects the light beam to/from objective lens 186. As compressed gas flows over the routing mirror, particle contaminants which had settled on it are blown away.

Note that with the cleaning cartridge 100 inserted in optical disk drive 180, the front portion of cleaning cartridge 100 is sticking out from the optical disk drive 180. The portion of cleaning cartridge 100 protruding from optical disk drive 180 includes the two levers 105–106, the lever protector cover, and the portion of the top cover over the lever protector cover.

Figure 7A:
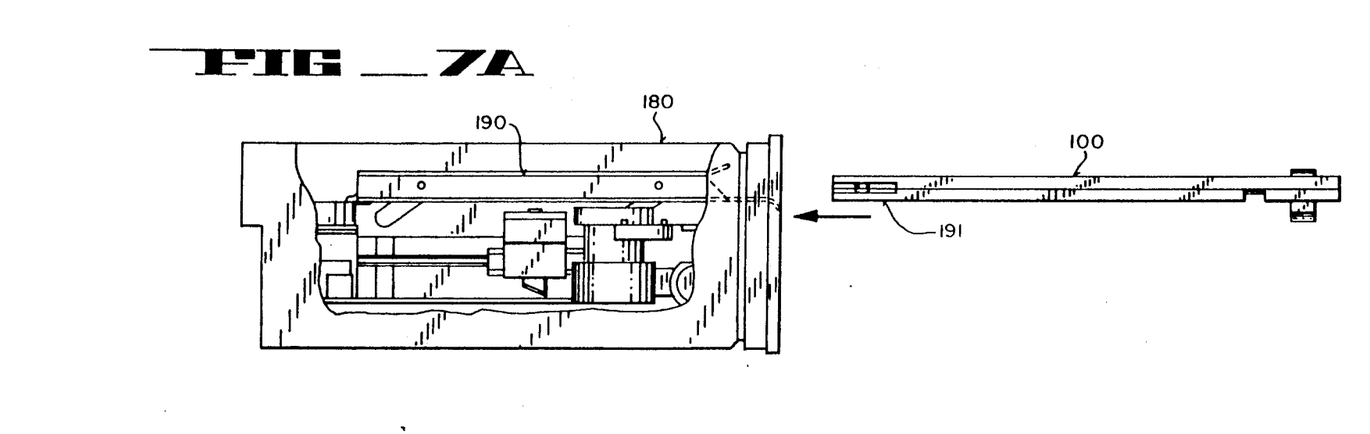
FIG. 7A illustrates a side view of the cleaning cartridge as it is being inserted into the optical disk drive.

FIG. 7A illustrates a side view of cleaning cartridge 100 as it is being inserted into and removed from optical disk drive 180. Note that the two levers 105–106 are both in their relaxed states when cleaning cartridge 100 is being inserted and removed. In other words, the back ends of the two pressure tubings are resting flush against the lower surface of top cover 101 (i.e., they are not protruding from the body of cleaning cartridge 100). This is important because depressing either one of the two levers during the insertion/removal process might cause the protruding tube to physically damage various internal components of the optical disk drive 180. Once the cleaning cartridge has been properly inserted, it becomes safe to depress the levers to move the tubings to their proper cleaning positions.

Tray 190 receives and holds cleaning cartridge 100 as it is being inserted. Upon insertion, tray 190, holding cleaning cartridge 100, drops approximately 3.25 millimeters down into optical disk drive 180. In comparison, disk cartridges normally drop about 4 millimeters. A recessed portion is provided in the disk cartridge for providing access by the magneto-optical magnet used to write data onto the disk.

However, in the present invention, there is no room for such a recess due to the channels running throughout cleaning cartridge 100. Consequently, in the currently preferred embodiment, a short plug 191, approximately 0.75 millimeters high is affixed to the bottom cover 102. Plug 191 is located so that when cleaning cartridge 100 is inserted and lowered into optical disk drive 180, it depresses a switch. Activating that switch sends a signal informing optical disk drive 180 that a cartridge has been inserted. Optical disk drive 180 then tries to "spin up". That is, it positions carriage 185 to access the inner-most track on the optical disk to read sector information. Since the present invention does not have an optical disk, optical disk drive 180 fails to find the expected information and goes into an idle mode. During idle mode, carriage 185 remains in that position. Hence, the pressure tubings may now be safely lowered. Furthermore, the gas nozzles/outlets are correctly positioned to clean the desired internal components. After the components have been cleaned, the user removes cleaning cartridge 100 by activating the eject button. Tray 190 lifts up, allowing the user to pull out and remove the cleaning cartridge 100.

Figure 7B:
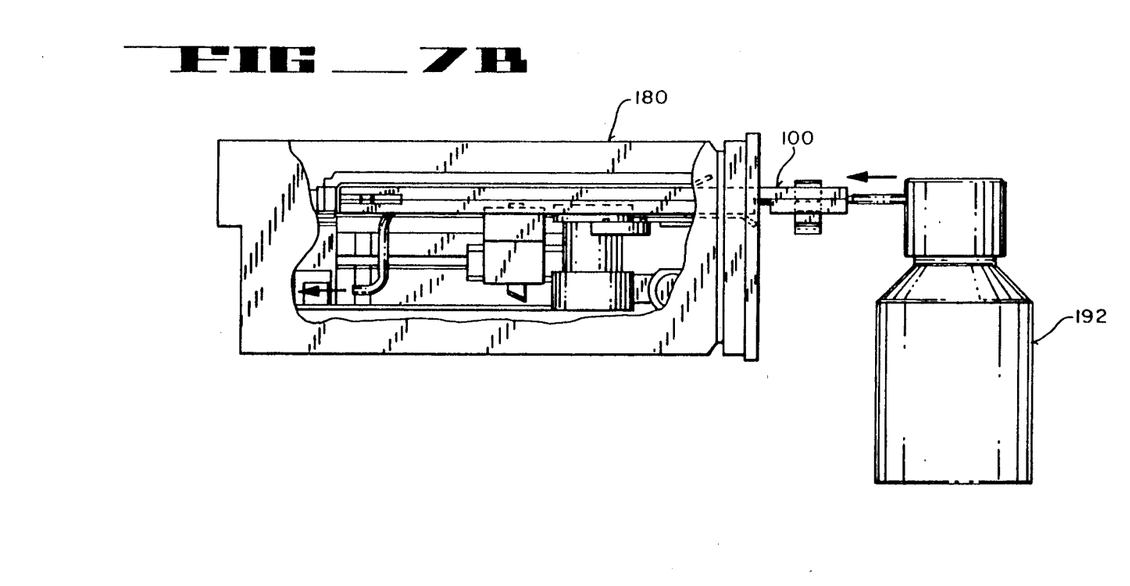
FIG. 7B illustrates a side view of a cleaning cartridge after it has been inserted into an optical disk drive, wherein forced air is cleaning the fixed optics.

FIG. 7B illustrates a side view of a cleaning cartridge 100 after it has been inserted into optical disk drive 180, wherein forced gas is cleaning the fixed optics. In the currently preferred embodiment, compressed gas and/or gas canister 192 is used to supply the compressed gas into the cleaning cartridge 100. Canister 192 is a commercially available off-the-shelf product. One such product is called MicroDuster ® OS, manufactured by TEXWIPE of Upper Saddle River, N.J. Typically, an air pressure within 100–140 psi is sufficient for cleaning purposes of the present invention. As noted above, the five channels are designed to be separate. The reason is to maximize the air pressure through each of the channels. In this manner, the gas directed at the various internal components have enough force to remove stubborn particle contaminants from the surfaces.

In order to clean the fixed optics, a user first depresses left lever 105. Next, the user holds canister 192 so that the tapered tip of its output nozzle is inserted into inlet 114 of cleaning cartridge 100. The cap 193 of canister 192 is depressed, which causes the compressed gas contained within canister 192 to be released through the left pressure tubing 104. The compressed gas is then directed so that it blows away particle contaminants on the fixed optics. After two short blasts of gas, the left lever 105 is released.

Note that when cleaning cartridge 100 is inserted and lowered into optical disk drive 180, carriage 185 and spindle motor 194 extend past the lower boundary of bottom cover 102. Referring back to FIG. 2, it is for this reason that opening 126 is provided in bottom cover 102.

Figure 7C:
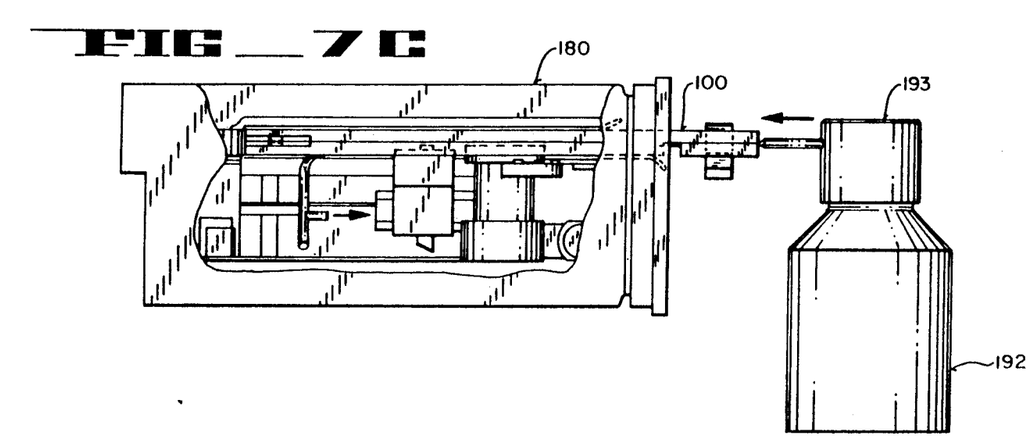
FIG. 7C illustrates a side view of a cleaning cartridge after it has been inserted into an optical disk drive, wherein forced air is cleaning the routing mirror.

FIG. 7C illustrates a side view of a cleaning cartridge 100 after it has been inserted into optical disk drive 180, wherein forced gas is cleaning the routing mirror. Again, compressed gas canister 192 is used to supply the compressed gas into the cleaning cartridge 100. In order to clean the routing mirror, a user first depresses right lever 106. Next, the user holds canister 192 so that the tapered tip of its output nozzle is inserted into inlet 116 of cleaning cartridge 100. The cap 193 of canister 192 is momentarily depressed, which causes the compressed gas contained within canister 192 to be released through the right pressure tubing 107. The short blast of gas is then directed by nozzle 188 so that it blows in the direction of the arrow, towards the surface of the routing mirror. Thereby, particle contaminants are removed from the surface of the routing mirror.

Figure 7D:
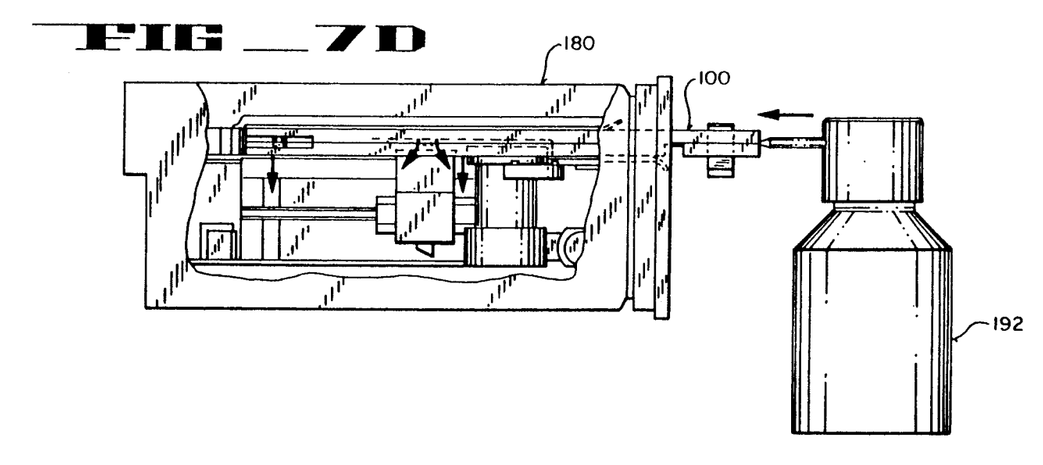
FIG. 7D illustrates a side view of a cleaning cartridge after it has been inserted into an optical disk drive, wherein forced air is cleaning the objective lens and the rails.

FIG. 7D illustrates a side view of a cleaning cartridge 100 after it has been inserted into optical disk drive 180, wherein forced gas is cleaning objective lens 186 and the rails 183-184. Again, compressed gas canister 192 is used to supply the compressed gas into the cleaning cartridge 100. In order to clean the back end of the left rail, the user holds canister 192 so that the tapered tip of its output nozzle is inserted into inlet 113 of cleaning cartridge 100. The cap 193 of canister 192 is momentarily depressed, which causes the compressed gas contained within canister 192 to blow on the back end of the right rail. This removes particle contaminants from that area. The same procedure is repeated for inlets 115 and 117, thereby cleaning the rails allowing carriage 185 to more easily slide on the rails. Forcing compressed gas through inlet 115 also results in gas being blown on the objective lens 186.

Figure 8:
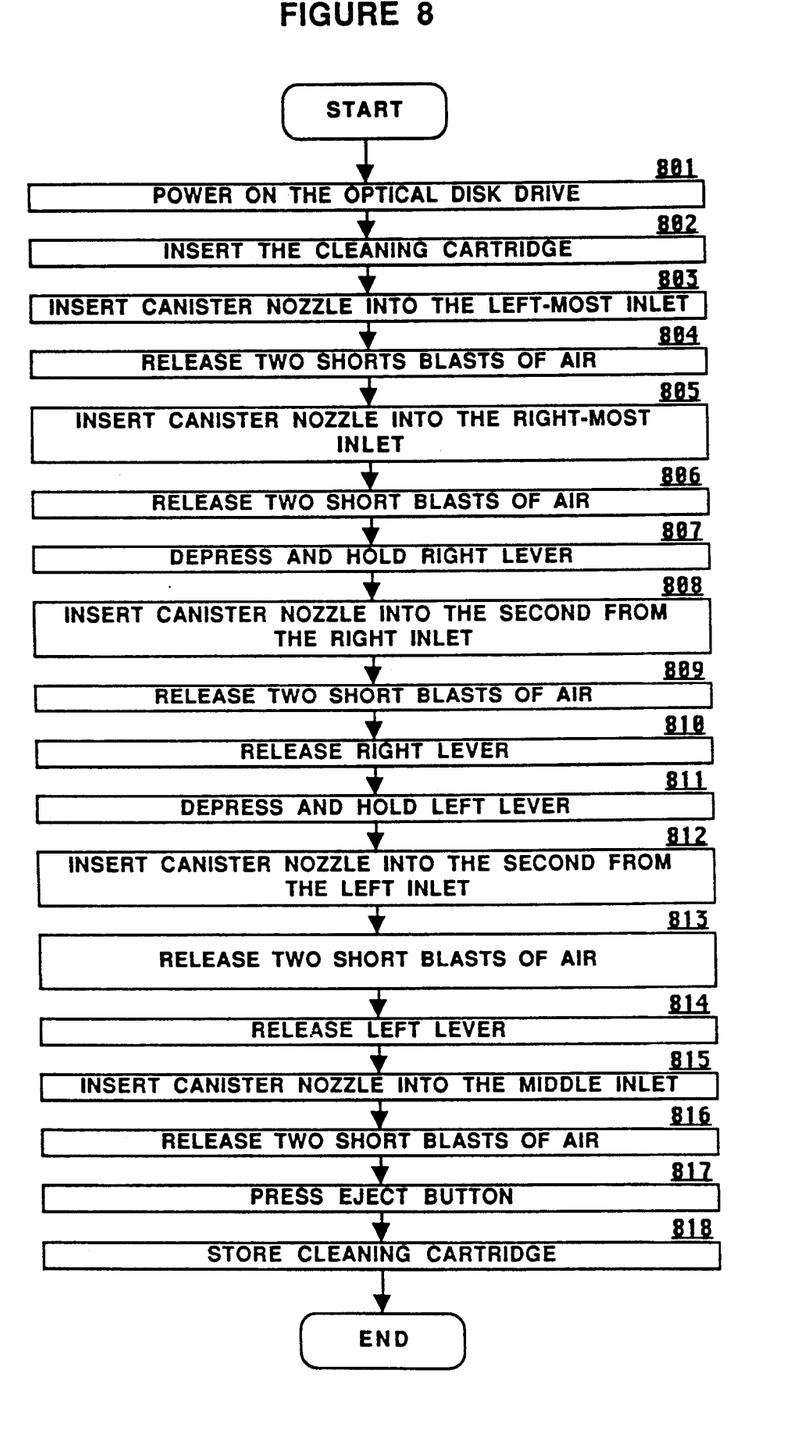
FIG. 8 illustrates a flowchart describing the sequential steps for performing the cleaning process of the present invention.

FIG. 8 illustrates a flowchart describing the sequential steps for performing the cleaning process of the present invention. First, the optical disk drive is powered ON, step 801. Next, the cleaning cartridge is inserted in the optical disk drive, step 802. The nozzle of the compressed gas canister is inserted into the left-most channel inlet of the cleaning cartridge, step 803. Two short blasts of gas is released from the canister, step 804. The canister nozzle is then inserted into the right-most channel inlet, step 805. Two short blasts of gas are released, step 806. Next, the user is required to depress and hold the right lever down, step 807. The canister nozzle is inserted into the second from the right channel inlet, step 808. Again, two short blasts of gas is released, step 809. Afterwards, the user can release the right lever, step 810. The user then depresses and holds down the left lever, step 811. The canister nozzle is inserted into the second inlet from the left, step 812. Two short bursts of gas are released, step 813. The left lever is released, step 814. Lastly, the canister nozzle is inserted into the middle inlet, step 815. Two short blasts of gas are released, step 816. The user removes the canister and hits the eject button to remove the cleaning cartridge, step 817. The cleaning cartridge is then stored in a safe place for future use, step 818.

What is claimed is:

1. An apparatus for removing particle contaminants from internal components of an optical recording device without requiring disassembly thereof, said apparatus comprising:
    (a) a housing including opposed first and second face-plates, a main portion insertable into said optical recording device, and a protruding portion which remains outside said optical recording device as said main portion is inserted therein, said protruding portion having an inlet face;
    (b) a recess formed in said first face-plate and having a depth, said recess separating said main portion from said protruding portion and allowing said main portion to draw closer to said internal components of said optical recording device by a distance equal to said depth when said main portion is inserted into said optical recording device;
    (c) a contoured opening formed in said first face-plate along said main portion;
    (d) a plurality of L-shaped hollow tubes being pivotally contained within said housing and protracting therefrom when acted upon by a corresponding plurality of spring-loaded levers rotationally mounted in said protruding portion, each said L-shaped hollow tube having an inlet and an outlet end, each said inlet end being attached to one of said spring-loaded levers and having an inlet opening located in said inlet face of said protruding portion, each said outlet end having an outlet opening to protract from said housing through said contoured opening; and
    (e) a plurality of channels formed in said second face-plate and having inlet openings located in said inlet face of said protruding portion and outlet openings located in said first face-plate, at least one of said plurality of channels having a multiplicity of outlet openings located in said second face-plate opposite said contoured opening.

2. An apparatus for removing particle contaminants from internal components of an optical recording device without requiring disassembly thereof, said internal components including movable and stationary components, said apparatus comprising:
    (a) a housing including opposed first and second face-plates, a main portion insertable into said optical recording device, and a protruding portion which remains outside said optical recording device as said main portion is inserted therein, said protruding portion having an inlet face;
    (b) a transverse recess formed in said first face-plate and having a depth, said transverse recess separating said main portion from said protruding portion and allowing said main portion to draw closer to said internal components of said optical recording device, when said main portion is inserted therein, by a distance equal to said depth;
    (c) a contoured opening formed in said first face-plate along said main portion, said contoured opening having a transverse section and a longitudinal section;
    (d) a plurality of L-shaped hollow tubes being pivotally contained within said housing and protracting therefrom when acted upon by a corresponding plurality of spring-loaded levers rotationally mounted in said protruding portion, each said L-shaped hollow tube having an inlet and an outlet end, each said inlet end being attached to one of said spring-loaded levers and having an inlet opening located in said inlet face of said protruding portion, each said outlet end having an outlet opening to protract from said housing through said transverse section of said contoured opening;
    (e) a plurality of channels formed in said second face-plate and having inlet openings located in said inlet face of said protruding portion and outlet openings located in said first face-plate around the periphery of said contoured opening;
    (f) at least one channel formed in said second face-plate and having an inlet opening located in said inlet face of said protruding portion, said channel also having a multiplicity of outlet openings located in said second face-plate opposite said longitudinal section of said contoured opening and in said first face-plate around the periphery of said contoured opening; and
    (g) contact means for instructing said optical recording device to position said movable components within said longitudinal section of said contoured opening.

3. The apparatus of claim 2 wherein said apparatus comprises two L-shaped hollow tubes.

4. The apparatus of claim 3 wherein said apparatus comprises two corresponding spring-loaded levers.

5. The apparatus of claim 2 wherein said apparatus comprise two channels.

6. The apparatus of claim 2 wherein said contact means comprises a protrusion located on said first face-plate along said main portion, said protrusion being positioned to depress a switch internal to said optical recording device.

7. An apparatus for removing particle contaminants from internal components of an optical recording device without requiring disassembly thereof, said internal components including movable and stationary components, said apparatus comprising:
   (a) a housing including opposed first and second face-plates, a main portion insertable into said optical recording device, and a protruding portion which remains outside said optical recording device as said main portion is inserted therein, said protruding portion having an inlet face;
   (b) a transverse recess formed in said first face-plate and having a depth, said transverse recess separating said main portion from said protruding portion and improving access of said main portion to said internal components of said optical recording device by allowing said main portion to draw closer to said internal components of said optical recording device by a distance equal to said depth when said main portion is inserted inside said optical recording device;
   (c) a contoured opening for further improving access of said main portion to said internal components of said optical recording device, said contoured opening being formed in said first face-plate along said main portion and having a transverse section as well as a longitudinal section;
   (d) a pair of L-shaped hollow tubes for directing pressurized gas, said pair of L-shaped hollow tubes being pivotally contained within said housing and protracting therefrom when acted upon by a corresponding pair of spring-loaded levers rotationally mounted in said protruding portion, each said L-shaped hollow tube having an inlet and an outlet end, each said inlet end being attached to one of said spring-loaded levers and having an inlet opening located in said inlet face of said protruding portion, each said outlet end having an outlet opening to protract from said housing through said transverse section of said contoured opening to direct said outlet opening at said internal components of said optical recording device;
   (e) a pair of channels for directing pressurized gas, said pair of channels being formed in said second face-plate and having inlet openings located in said inlet face of said protruding portion and outlet openings located in said first face-plate around the periphery of said contoured opening, said outlet openings being directed at said internal components of said optical recording device;
   (f) a channel for directing pressurized gas, said channel being formed in said second face-plate and having an inlet opening located in said inlet face, said channel also having a multiplicity of outlet openings located in said second face-plate opposite said longitudinal section of said contoured opening and in said first face-plate around the periphery of said contoured opening, said outlet openings being directed at said internal components of said optical recording device; and
   (g) a protrusion located on said first face-plate along said main portion and positioned to depress a switch internal to said optical recording device for orienting said movable components of said optical recording device within said longitudinal section of said contoured opening.

8. A method of removing particle contaminants from internal components of an optical recording device without requiring disassembly thereof, said internal components including movable and stationary components, said method comprising the steps of:
   (a) inserting a cartridge into said optical recording device, said cartridge having opposed first and second face-plates, a main portion fully insertable into said optical device, and a protruding portion which remains outside said optical recording device as said main portion is inserted therein, said protruding portion having an inlet face, said main portion and said protruding portion being separated by a transverse recess formed in said first face-plate and having a depth;
   (b) allowing said main portion to draw closer to said internal components of said optical recording device by a distance equal to said depth of said transverse recess to improve access of said main portion to said internal components of said optical recording device;
   (c) causing said movable internal components of said optical recording device to become positioned within a contoured opening formed in said first face-plate along said main portion, said contoured opening having a transverse section and a longitudinal section;
   (d) protracting from said cartridge, by activating one of a plurality of spring-loaded levers rotationally mounted within said protruding portion, one of a plurality of L-shaped hollow tubes each having an inlet end and an outlet end, each said inlet end having an inlet opening located in said inlet face of said protruding portion, each said outlet end having an outlet opening to protract through said transverse section of said contoured opening;
   (e) removing said particle contaminants from said internal components of said optical recording device by forcing pressurized gas into said inlet opening of said L-shaped hollow tube of step (d) and allowing said outlet opening to direct said pressurized gas at said internal components from a first general direction;
   (f) retracting said L-shaped hollow tube of steps (d) and (e) into said cartridge by deactivating said spring-loaded lever of step (d);
   (g) repeating steps (d), (e), and (f) for each of the remaining plurality of L-shaped hollow tubes;
   (h) removing said particle contaminants from said internal components of said optical recording device by sequentially forcing pressurized gas into inlet openings of a plurality of channels formed in said second face-plate, said plurality of channels having inlet openings located in said inlet face of said protruding portion and outlet openings located in said first face-plate, and allowing said outlet openings to direct said pressurized gas at said internal components from a second general direction;

(i) removing said particle contaminants from said internal components of said optical recording device by forcing pressurized gas into a channel formed in said second face-plate, said channel having an inlet opening located in said inlet face and a multiplicity of outlet openings located in said second face-plate opposite said longitudinal section of said contoured opening and in said first face-plate around the periphery of said contoured opening, and allowing said multiplicity of outlet openings to direct said pressurized gas at said internal components of said optical recording device from a third general direction; and (j) removing said cartridge from said optical recording device.

9. The method of claim 8 wherein step (c) is performed by a protrusion located on said first face-plate along said main portion, said protrusion being positioned to depress a switch internal to said optical recording device.

* * * * *